June 8, 1954  H. F. BREMER ET AL  2,680,802
ELECTRICAL FLUID HEATER
Filed April 12, 1952  2 Sheets-Sheet 1

INVENTORS
HERMANN F. BREMER &
JOSEPH A. GONDOLFO
BY
Kenyon & Kenyon
ATTORNEYS.

INVENTORS
HERMANN F. BREMER &
JOSEPH A. GONDOLFO
BY
Kenyon & Kenyon
ATTORNEYS

Patented June 8, 1954

2,680,802

UNITED STATES PATENT OFFICE 2,680,802

ELECTRICAL FLUID HEATER

Hermann F. Bremer and Joseph A. Gondolfo, Bronx, N. Y., assignors to Rainbows, Inc., Bronx, N. Y., a corporation of New York Application April 12, 1952, Serial No. 281,944

16 Claims. (Cl. 219—40)

This invention relates to an electric heater adapted for the quick heating of a flowing liquid stream, and is here disclosed in its application to the heating of water for use in a hot coffee vending machine.

The heater of the present invention may be used in connection with any device which requires a supply of hot water in its operation, more particularly wherein the hot water supply must be delivered at or about a predetermined temperature. Examples of such devices are hot coffee vending machines, vending machines for other kinds of hot drinks, dish washers, laundry machines, and the like.

Among the objects of the invention are to provide an electric hot-water heater containing a multiplicity of heating units or sections through which the water passes in succession, having different effective capacities for heat generation, whereby the device is suited for installation in different parts of the country where the mineral content of the water supply, and thus its electrical conductivity, may be widely different.

Another object of the invention is to provide a fluid heating device wherein the length and cross-sectional area of the electrical path through the fluid can be accurately controlled under conditions of quantity manufacture and rapid assembly.

This application is a continuation-in-part of copending application Ser. No. 134,754, filed December 23, 1949, for "Electric Hot Water Heating Element," now abandoned.

Reference is made to the accompanying drawings, in which

Fig. 1 is a fragmentary perspective view of a hot coffee vending machine with portions broken away to show the interior construction thereof. In such a machine, a hot water heater according to this invention may be positioned within the sub-assembly 15 and delivers hot water through hose 64 to the mixing chamber 13.

Fig. 5 also shows, diagrammatically, an example of an electrical circuit arrangement whereby the heater of the present invention may be connected with a source of electric power.

Figure 1:
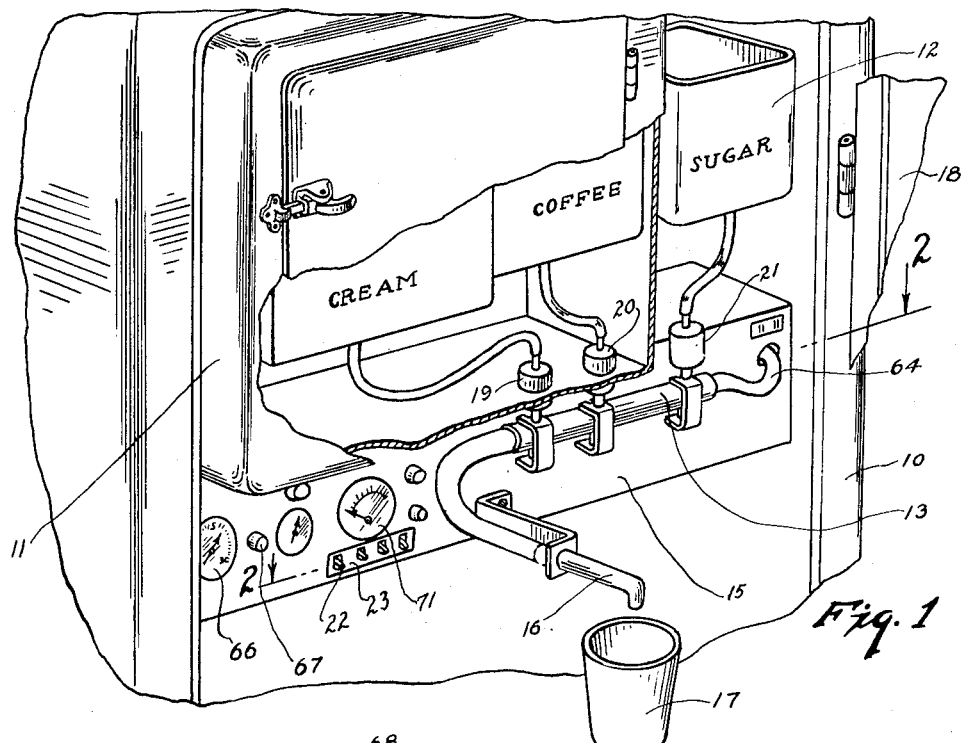
Figure 2:
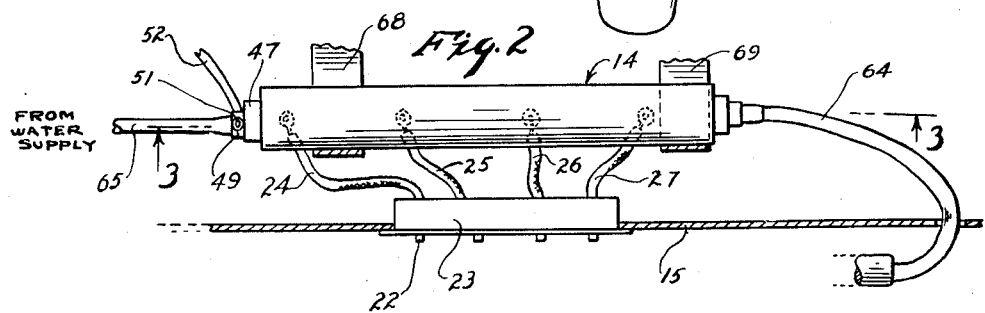
Fig. 2 is a fragmentary horizontal sectional view on the line 2—2 of Fig. 1 showing the electrical heater 14 of the present invention in plan.

Referring to Figs. 1, 2 and 3, 10 represents the casing of a coffee dispensing machine in which there is disposed a refrigerating unit 11 adapted to contain coffee and cream, a liquid sugar container 12, a mixing chamber 13 connected with a water supply extending from an electrical heater 14 of the present invention and located in sub-assembly 15. Hot coffee is dispensed from a spout 16 into a cup 17 positioned in an opening in a door 18 that covers the front of the apparatus. Connected to the mixing chamber 13 are magnetically operated valves 19, 20 and 21 for controlling the flow of the various ingredients which make up the coffee drink. The magnetic valves 19 and 20 lie within the refrigerating unit as through them must pass cream and liquid coffee that must be kept under refrigeration.

On the sub-assembly 15 is a set of switches 22 in a common casing 23 of conventional construction which is connected to a source of current supply and these switches are electrically connected respectively by wires 24, 25, 26 and 27 to terminal posts 28, 29, 30 and 31 respectively of the electrical heater 14.

Figure 3:
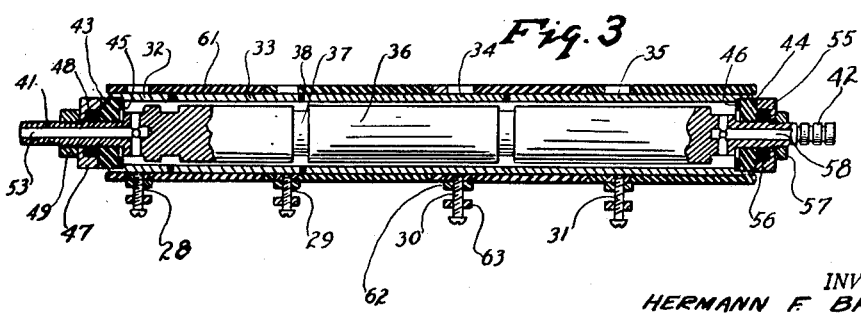
Fig. 3 is a vertical sectional view of one form of electrical heater made according to the present invention, taken on line 3—3 of Fig. 2.

The respective terminals are connected respectively with different conductive sleeves 32, 33, 34 and 35, each constituting a secondary electrode, and located end-to-end. These sleeves, in the form of device shown in Fig. 3, are of the same internal diameter but of different lengths and therefore of different internal surface areas. Positioned within these sleeves is a central drum-shaped member 36, constituting a primary electrode, which is coaxially mounted with the sleeves and has an external diameter smaller than the internal diameter of the sleeves, thus providing an annular space for water to flow between it and the sleeves. This central member or electrode 36 has annular grooves 37 located adjacent sealed ends of the sleeves, as indicated at 38. The sleeves are sealed and insulated from one another by such seals.

The central electrode 36 has threaded inlet and outlet end portions or projections 41 and 42 adapted to carry insulators 43 and 44 respectively. The insulators 43 and 44 are respectively sealed to the respective end contact sleeves 32 and 35 by sealing washers 45 and 46 respectively. The contact sleeves are kept properly spaced relative to the peripheral surface of the electrode 36 by these insulating washers 43 and 44. The washer 43 is held in place on the projection 41 by a metal washer 47 which carries a sealing ring 48 and a securing nut 49. The securing nut 49 has a terminal 51 to which is attached a wire 52 serving to place the electrode 36 in the electrical circuit. The water enters the inlet portion 41 through opening 53 thereof and surrounds the electrode to establish the electric circuit between the drum-like electrode 36 and the sleeve electrodes 32, 33, 34 and 35. With this circuit established, the water will become quickly heated because of its resistance to current flow.

The insulating washer 44 is held on portion 42 by a washer 55 having a seal 56 and a nut 57 threaded on the portion 42. The outlet portion 42 has an opening 58 through which the hot water will be discharged.

Surrounding the sleeve electrodes are a plurality of insulating sleeves 61 carrying respectively the terminal posts 28, 29, 30 and 31. The sleeves tightly receive the sleeve electrodes and the seals 33. The terminal posts 28, 29, 30 and 31 may be tapped into the sleeve electrodes and are locked respectively by lock nuts 62 of the respective screws. A second nut 63 may be provided upon each terminal post to effect the connection of the respective wires 24, 25, 26 and 27 thereto.

The outlet portion 42 of the central electrode may be connected by a hose 64 with the mixing member 13. Water is led to the inlet portion 41 of the electrode 36 by a pipe 65 leading from a water supply. On the sub-assembly is a gauge 66 from which the pressure of the water can be determined. A regulating valve element 67 can control the rate of water flow. The heater can be supported by straps 68 and 69 fixed to the sub-assembly 15.

When making an adjustment for the proper current to be supplied to the heater, to heat the water to the desired degree of temperature, an ammeter 71 is provided. The meter reading is taken as the different switches 22 are thrown on and off. When the meter shows that the proper current is flowing, the heater will have been properly adjusted for the given water condition. Any combination of the switches 22 can be used, if, by the use of one sleeve electrode alone, the desired amperage flow is not provided.

Figure 4:
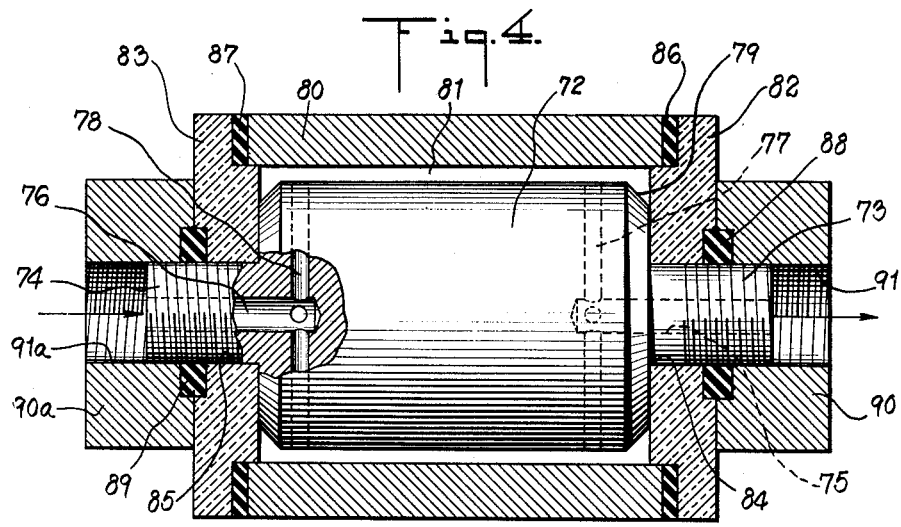
Fig. 4 is a vertical longitudinal sectional view of a heater unit containing one electrode pair made according to a modified form of our invention.
Figure 5:
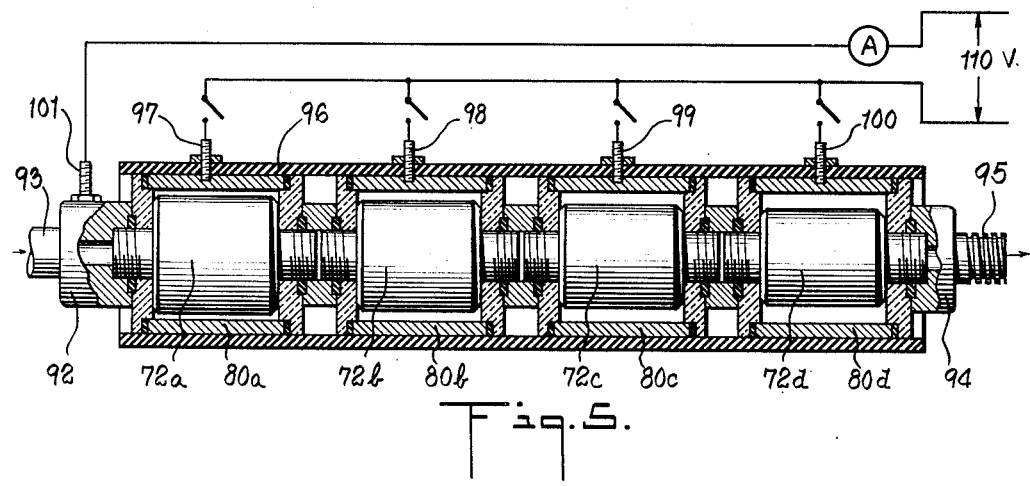
Fig. 5 is a vertical longitudinal section through a heater embodying our invention comprising four units similar to the unit shown in Fig. 4.
Figure 6:
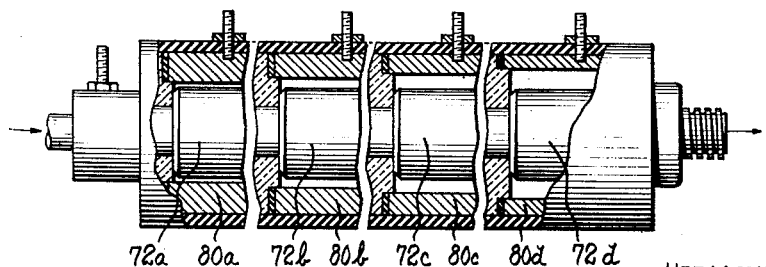
Fig. 6 is a fragmentary vertical longitudinal section, with parts in elevation and other parts omitted, of a heater embodying another modification of the present invention.

Referring to the modifications shown in Figs. 4, 5 and 6, the heater may also be made in the form of a series of heater units, one of which is shown in Fig. 4, and four of which interconnected together are shown in Fig. 5 and (in another modification) in Fig. 6.

Referring particularly to Fig. 4, the primary electrode is machined from solid metal in such form that it consists of a drum 72 of essentially cylindrical shape, said drum having on each end thereof a hub-like extension 73, 74, each hub being coaxial with and constituting a prolongation of the central axis of drum 72, and being of substantially smaller diameter than the diameter of drum 72. The hubs 73, 74 are formed integrally with drum 72. Within each hub is a longitudinal drilling 75, 76 constituting a water passageway located axially and extending longitudinally thereof and penetrating a short distance into the drum 72. Lateral drillings 77, 78, of which there may be several at each end of the drum 72, communicate with longitudinal drillings 75, 76 and form with said last-mentioned drillings a water passageway whereby water entering at the extremity of one hub may pass therethrough, thence to the surface of drum 72 and finally to the extremity of the other hub. Preferably, though not necessarily, drum 72 may be beveled as at 79. Such bevel serves as a trap for sediment and the like.

A metallic sleeve 80 constitutes a secondary electrode and, having an inside diameter slightly larger than the outside diameter of drum 72, is mounted coaxially with drum 72 and in nested relation therewith, by the supporting means hereinafter described, to form an annular space or channel 81 between drum 72 and sleeve 80. Thus, water passing in contact with the surface of drum 72 is confined between drum 72 and sleeve 80, which are respectively the primary and secondary electrodes of the heater unit.

The above-mentioned electrodes may be secured in the described position by any suitable means. One such means comprises a pair of discs 82, 83 formed of insulating material, such for example as ceramic material, having a central opening 84, 85 adapted to fit upon hubs 73 and 74, respectively. Discs 82, 83 in turn engage the opposite ends of sleeve 80, and are pressed thereagainst to maintain sleeve 80 in its proper position with relation to drum 72.

Sealing rings 86, 87 are preferably inserted between the ends of sleeve 80 and discs 82 and 83, to prevent leakage of water.

Hubs 73 and 74 are externally screw-threaded for engagement therewith of couplers 90, 90a or other attachment fixtures. Sealing rings 88, 89 are adapted to be compressed against discs 82, 83 by means of couplers 90, 90a which are internally screw-threaded at 91, 91a and are adapted to mesh with screw threads on the external surface of the hubs. The water-transmitting function of couplers 90, 90a will appear in connection with the description of Fig. 5. Another function of the couplers, in combination with the threads on the hubs, is to maintain sleeve 80 under longitudinal compression and thus secure the electrode assembly in predetermined fixed position.

Where the mineral content of the water and the rate of flow is known in advance, a single unit as shown in Fig. 4 can be used, the size and surface area of the electrodes being predetermined to effect the desired rise in water temperature at the available voltage. A heater so made of a single electrode pair is an efficient instrument for heating fluid passing through it. Its lack of flexibility, however, especially where the available voltage is constant, is the reason why more than one such pair may be arranged in series in the path of fluid flow and in parallel in the path of current flow, as set forth below.

Where the mineral content of the supply water varies widely from location to location, a single electrode pair, as above described, will produce different heating effects for the same rate of water flow. The more ions there are in solution, the lower will be the electrical resistance of a water pathway, of given cross-sectional area and of fixed length. When the rate of water flow and the applied voltage remains the same, the heating effect is proportional to the amperes which pass through the water. Since an appliance utilizing hot water—for example, a hot coffee vending machine—requires at each cycle of operation a predetermined amount of hot water, at a predetermined delivery temperature, and at about a predetermined rate of flow, and must produce this result by the use of the 110 volt current which is standard in most installations, it will be apparent that the important variable from one location to another is the difference in ion content, and hence of electrical resistance, of local water supplies. These differences are in fact so great that the range of adjustment required in an electrical heater suited to meet all water conditions commonly encountered should preferably admit of reducing current flow to at least one-tenth of the maximum which the device will handle.

In order to achieve such a wide range of adjustment in a standard device, a series of heater units, such as that shown in Fig. 4, may be connected together in end-to-end relation by means of a series of couplers. In Fig. 5 there is shown a heater made up of four such units, but any number may be used and this particular number is shown for illustration only. In this case there are three couplers interposed between adjoining heater units, and at one end (the left end as seen in Fig. 5) there is provided an inlet coupler 92 adapted to be screw-threadedly engaged with the hub at the left-hand end of the first heater unit, and to afford attachment for a pipe 93 through which water is fed to the device from a suitable source of supply. At the opposite end of the heater (the right-hand end as seen in Fig. 5) there is attached a delivery coupler 94 which is screw-threadedly engaged with the hub at the right-hand end of the last heater unit in the series, and is provided with an end portion or nozzle 95 to which a rubber hose or the like may be attached. In this device water flows through the several heating units in series.

The several heating units as shown in Fig. 5 may be enclosed within a tube 96 of insulating material, and electrical terminals 97, 98, 99, 100 may be tapped through tube 96 to a point of electrical contact and mechanical securement with each of the sleeves 80a, 80b, 80c and 80d of the respective heater units shown. An electrical terminal 101 may be secured upon inlet coupler 92. The electrical current source, diagrammatically indicated at "110 v." in Fig. 5, is preferably connected in such manner that one side of the current is secured to terminal 101, and the other side of the current is connected to each of the terminals 97, 98, 99 and 100 through a separate switch, as shown diagrammatically, such that the several sleeves 80a, 80b, 80c and 80d are connected in parallel in the circuit, and each is under the control of a separate manually operable switch. Thus, when four heater units are arranged as shown in Fig. 5, any one or more of them may be energized, according to the requirements of the particular water which the machine is to handle. If desired, an insulating connection may be interposed between terminal 101 and pipe 93.

When necessary to obtain a wide range of heating capabilities, the several electrode pairs shown in Fig. 5 may be made in such manner that, with the same type of water, the resistance to passage of electrical current of different electrode pairs may be different. In the device shown in Fig. 3 this was accomplished, as pointed out above, by varying the length of the sleeves. In the form of device shown in Fig. 5 this may be accomplished by making the drums of different external diameter or surface areas; and in the form shown in Fig. 6 by making the sleeves of different internal diameter or internal surface areas.

In Fig. 5 the drums 72a, 72b, 72c and 72d are of progressively decreasing external diameter. This is shown in Fig. 5 to an exaggerated degree for the sake of clarity, the internal diameter of the sleeves remaining the same in all four units.

In Fig. 6 there is illustrated a four-unit heater wherein the drums 72a, 72b, 72c and 72d are of the same diameter and sleeves 80a, 80b, 80c and 80d are of progressively increasing interior diameter in successive units counting from left to right in Fig. 6.

In either case the result is that the electrical path from sleeve 80 to drum 72, through annular space 81, is of different length in different heater units, and furthermore the area of one of the electrodes (either the sleeve or the drum) is different in the different heater units.

As a specific example of a hot-water heater which has successfully handled a wide variety of water conditions encountered in communities in the northeastern section of the United States, for use in a hot coffee vending machine, the following particulars are given: At a water pressure of about 6 lbs. per sq. in., and a starting temperature of about 70° F., the heater is designed to handle a flow of about one ounce of water per second and to raise the water to a temperature of 180° F. during a time of passage of about one second. The electrical supply is assumed to be at about 110 or 115 volts. At this voltage, and in order to raise one ounce of water per second from a temperature of about 70° F. to about 180° F., it has been found that about ten amperes of current must pass through the water, whatever may be its condition or conductivity.

If the water is "hard"—i. e., has a high content of ions in solution, the water will be more conductive, and consequently too much current will flow and the water will be heated to too high a temperature. Under such conditions as these, it is necessary to reduce the number of units, or to increase the length of the electrical path through the water, or to make the electrode area smaller, or some combination of all of these things. These compensations may be accomplished in the form of device shown in Fig. 5 by making the four sleeves of a uniform length of about 1½ inches and a uniform internal diameter of 1 inch. The four drums have external diameters respectively of .937 inch, .915 inch, .900 inch and .885 inch and are of the same length slightly less than the length of the sleeves. Under the particular conditions stated the length of the electrical pathway in the flowing water, in the four heater units respectively, is 0.0315, 0.0425, 0.05 and 0.0575 inch, measuring radially the gap between the surface of the drum and the surface of the sleeve.

By making the different heater units of different gap, or different electrode area, a wider and more accurate range of choice in adjustment can be obtained than would be the case if the heater units were the same. If it be supposed that one heater has a heating capacity of one unit, another of two, another of three, and another of four, it is possible by combinations of these to adjust the group of heaters for any heat capacity between one and ten units thereof.

The invention is not limited to any particular shape or form herein shown, except where stated to be of the essence, and includes all modifications thereof which are comprehended within the attached claims.

What is claimed is:

1. An electric fluid heater comprising a solid drum-shaped primary electrode having at each of its ends and formed integrally therewith an axially disposed hub-like extension of smaller diameter than the drum, a longitudinal fluid passageway extending axially of each of said hub-like extensions from the outer end thereof towards the drum-shaped central portion of the electrode and terminating therein, lateral fluid passageways communicating with the passageways first named, a sleeve constituting a secondary electrode whose inner diameter is greater than the outer diameter of the drum-shaped portion of the primary electrode, and two members of insulating material each having an opening engaged upon the hub-like extension at opposite ends of the primary electrode, the ends of said sleeve being engaged between the said two insulating members and supported thereby in coaxial relation with and surrounding the drum-shaped portion of the primary electrode, whereby fluid entering at one of the hub-like extensions is caused to flow between the outer surface of the drum-shaped primary electrode and the inner surface of the sleeve in a direction generally parallel to the axes of said electrodes and thence out the other of said hub-like extensions, and means to conduct electric current to said electrodes while fluid flows between them.

2. An electric fluid heater comprising a series of solid metallic drums constituting primary electrodes and electrically connected together, a hub-like extension at each end of each drum and of smaller diameter than the drum, metallic sleeves constituting secondary electrodes equal in number to the number of drums, each of said drums and one of said sleeves together forming an electrode pair mounted coaxially and in nested relation with the inner diameter of the sleeve being larger than the outer diameter of the drum thus forming an annular space between them, insulating supporting members engaging the opposite ends of said electrodes to secure them in position and insulate each sleeve from each other sleeve, interconnecting fluid passageways extending axially of said hub-like extensions and laterally within each drum whereby fluid entering at one of said hub-like extensions is caused to flow in the annular space between the drum and sleeve of each electrode pair and thence to another of said hub-like extensions, thus passing through each of said electrode pairs in series, and means for selectively supplying electric current to any of said electrode pairs in parallel to control the amount of heat imparted to the fluid.

3. An electric fluid heater as described in claim 2 wherein at least two of said sleeves are of different internal surface area.

4. An electric fluid heater as described in claim 2 wherein at least two of said sleeves are of different length.

5. An electric fluid heater as described in claim 2 wherein at least two of said sleeves are of different internal diameter.

6. An electric fluid heater as described in claim 2 wherein at least two of said drums are of different external surface area.

7. An electric fluid heater as described in claim 2 wherein at least two of said drums are of different external diameter.

8. An electric fluid heater comprising a solid primary electrode whose outer surface in a plane at right angles to its axis is circular in shape, a metallic tubular extension of less diameter than said electrode projecting at each end thereof and coaxial therewith, said tubular extensions being adapted to serve as the supports for said electrode and also to conduct fluid to and from the heater, a secondary electrode surrounding and coaxial with the primary electrode and having an inner surface which in the plane aforesaid is circular in shape and greater in diameter than the diameter of the circular outer surface of the primary electrode, two members of insulating material each having an opening therein adapted to engage one of said tubular extensions and each engaging an opposite end of the secondary electrode and thus supporting said electrodes in nested and coaxial relation in such manner that the two electrodes define an annular fluid space between the outer surface of the primary electrode and the inner surface of the secondary electrode, fluid passageways at right-angles to the axis of said electrodes interconnecting the interiors of said tubular extensions respectively with opposite ends of said annular space whereby fluid entering at one of said tubular extensions is caused to flow in said annular space in a direction generally lengthwise of the common axis of said electrodes and thence out the other of said tubular extensions, and means to conduct electric current to said electrodes while fluid flows between them.

9. An electric fluid heater as described in claim 8 wherein one of said electrodes is divided into segments insulated from each other and adapted to be separately energized in parallel across the current source.

10. An electric fluid heater as described in claim 8 wherein the secondary electrode is divided into segments insulated from each other and adapted to be separately energized in parallel across the current source.

11. An electric fluid heater as described in claim 8 wherein one of said electrodes is divided into segments insulated from each other and at least two of said segments are of different surface area.

12. An electric fluid heater as described in claim 8 wherein one of said electrodes is divided into segments insulated from each other and at least two of said segments are of different length.

13. An electric fluid heater as described in claim 8 wherein the secondary electrode is divided into segments insulated from each other and at least two of said segments have inner surfaces of different diameter.

14. An electric fluid heater as described in claim 8 wherein the secondary electrode is divided into segments insulated from each other, the primary electrode is divided into segments electrically connected to each other, and each segment of the secondary electrode forms with a corresponding segment of the primary electrode a space for flow of fluid between them.

15. An electric fluid heater as described in claim 8 wherein the secondary electrode is divided into segments insulated from each other, the primary electrode is divided into segments electrically connected to each other, and at least two of the primary electrode segments have outer surfaces of different diameter.

16. An electric fluid heater as described in claim 8 wherein the secondary electrode is divided into segments insulated from each other, the primary electrode is divided into segments electrically connected to each other, and at least two of the primary electrode segments are of different external surface area.

References Cited in the file of this patent

UNITED STATES PATENTS

| Number | Name | Date |
|---|---|---|
| 1,668,293 | Van Tuyl | May 1, 1928 |
| 1,730,016 | Rudd | Oct. 1, 1929 |
| 2,100,329 | Getchell | Nov. 30, 1937 |